United States Patent [19]

Smith

[11] Patent Number: 4,825,901
[45] Date of Patent: May 2, 1989

[54] TEMPERATURE COMPENSATING FLUID METERING VALVE

[75] Inventor: Trevor S. Smith, Sutton Coldfield, England

[73] Assignee: Lucas Industries Public Limited Company, Birmingham, England

[21] Appl. No.: 198,531

[22] Filed: May 25, 1988

[30] Foreign Application Priority Data

Jul. 24, 1987 [GB] United Kingdom ................. 8717637

[51] Int. Cl.$^4$ ............................................. F16K 31/68
[52] U.S. Cl. ................................ 137/468; 137/625.63; 137/625.64; 251/31
[58] Field of Search .............. 137/468, 625.63, 625.64; 251/25, 30.01, 31

[56] References Cited

U.S. PATENT DOCUMENTS

| | | | |
|---|---|---|---|
| 3,128,750 | 4/1964 | Schmidt | 251/31 X |
| 3,340,893 | 9/1967 | Lockwood | 137/468 |
| 3,395,726 | 8/1968 | Cross et al. | 137/468 |
| 3,521,662 | 7/1970 | Bache | 137/468 X |
| 4,023,594 | 5/1977 | Kats et al. | 137/468 X |
| 4,266,572 | 5/1981 | Schuttenberg et al. | 137/625.63 |
| 4,593,719 | 6/1986 | Leonard | 137/625.64 X |
| 4,705,219 | 11/1987 | Pagdin | 137/468 X |

Primary Examiner—John Rivell
Attorney, Agent, or Firm—Michael F. Petock

[57] ABSTRACT

A temperature compensated fluid metering valve has a body including a ported sleeve in which a metering element is slidable, the thermal coefficient of expansion of the sleeve and metering element being identical and different from that of the body. The sleeve is secured at one of its ends to the body and a device for detecting the position of the metering element is secured to the body at the other end of the sleeve. The dimensions of the body and the coefficients of expansion are selected so a change in temperature results in an apparent position error signal from the device, this signal repositioning the metering element to compensate for changes in specific gravity of the metered fluid as a result of the temperature change.

4 Claims, 1 Drawing Sheet

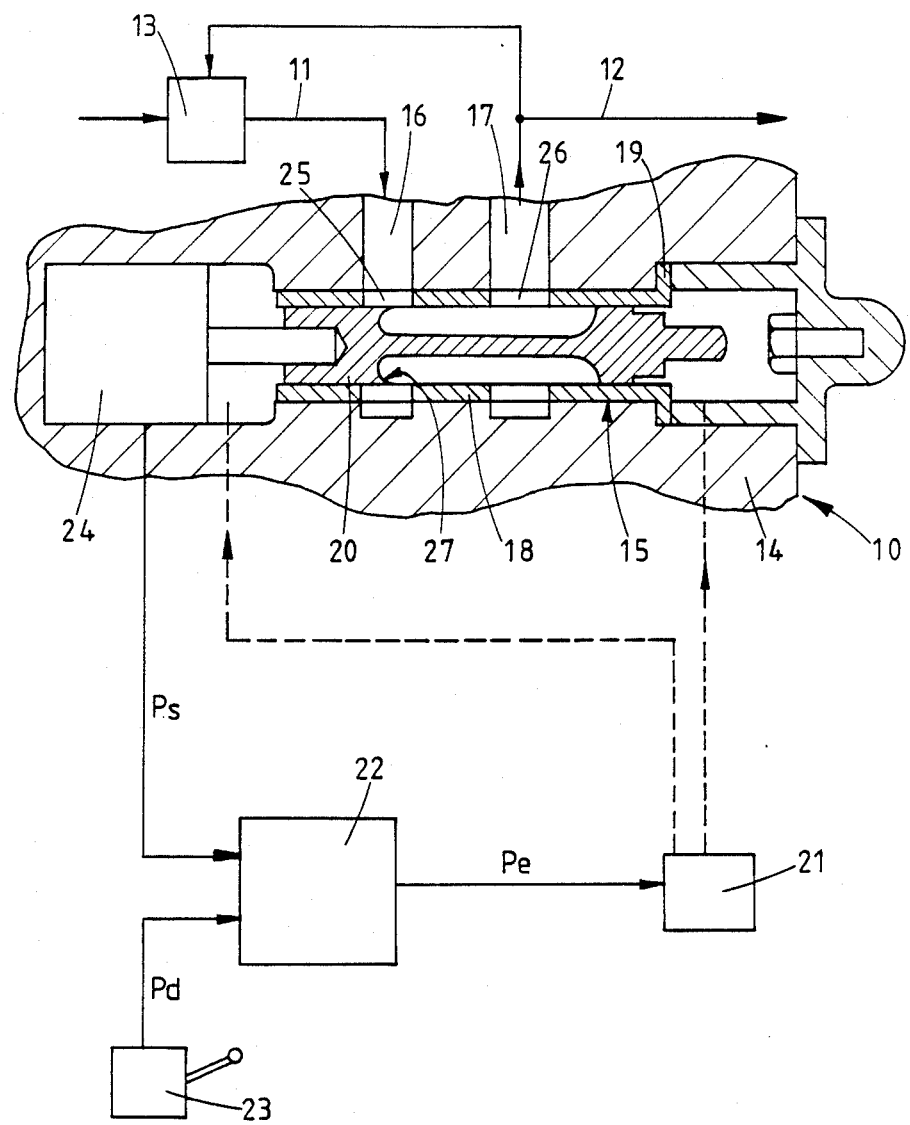

TEMPERATURE COMPENSATING FLUID METERING VALVE

Metering valves typically regulate fluid flow on a volume basis. Where a selected mass flow of the fluid is required to be delivered and where the specific gravity of the fluid changes markedly with temperature it is desirable that volume flow shall be adjusted in a way which takes account of changes in specific gravity. This is particularly the case where the metered fluid forms a fuel supply to a gas turbine engine. In a particular case, with a constant metering area of the valve and with a constant pressure drop across the valve, fuel mass flow will decrease by 2.4% for a 50° C. temperature rise. It has been proposed to compensate for changes in specific gravity of fuel by providing temperature sensitive elements which regulate the metering pressure drop. The present invention provides a metering valve whose components react to changes in temperature, and hence of specific gravity of the metered fluid, to maintain a substantially constant mass flow for a given selected metering area.

According to the invention there is provided a temperature-compensating fluid metering valve comprising a body having a bore a ported sleeve within said bore, said sleeve being secured to said body at one end of said bore, a metering element axially slidable in said sleeve and co-operating with the ports to vary the effective flow area of said valve, an actuator coacting with said element to position the latter relative to said sleeve, and a device secured to the other end of said bore for generating a signal corresponding to a sensed axial position of the other end of said element, said actuator being responsive to a difference between a desired axial position of said element and said sensed axial position thereof, the linear coefficient of expansion of said body being larger than that of said sleeve such that a change in metering area of said valve in response to a change in temperature compensates for a change in specific gravity of the fluid as a result of said change in temperature.

An embodiment of the invention will now be described by way of example only and with reference to the accompanying drawing which shows, diagrammatically, an arrangement for metering fuel flow with a constant metering pressure drop.

A metering valve 10 is connected between a fuel supply line 11 and a fuel delivery line 12, and a device 13 of a known type is responsive to the pressures in the lines 11, 12 for maintaining a pressure difference across the valve 10 substantially constant. The valve 10 comprises an aluminium body 14 having a stepped bore 15 therein. Inlet and outlet ports 16, 17 open into the bore 15 and communicate with the lines 11, 12 respectively. A steel sleeve 18 has ports 25, 26 substantially aligned with the ports 16, 17 respectively and has one of its ends 19 secured to the body 10 adjacent one end of the bore 15. A steel control element 20 is axially slidable within the sleeve 18 to control flow between the ports 16, 17. The element 20 is positioned by an actuator 21 which coacts with the element 20. The actuator 21 is typically a hydro-electric valve arrangement and is responsive to a position error signal Pe supplied by a control circuit 22 which is responsive to a difference between a desired position signal Pd from a flow selection device 23 and a sensed position signal Ps from a linear displacement transducer 24 which is secured to the body 14 at an end of the bore 15 remote from that to which the sleeve end 19 is secured.

In use, and with the control element 20 in a selected position, as shown, a required mass flow of fuel as selected by the device 23 is delivered on the line 12. A rise in fuel temperature will result in a reduction in its specific gravity and would, in the absence of compensation, result in a reduction in mass flow. The rise in fuel temperature is, however, also experienced by the sleeve 18, element 20 and body 14 all of which expand linearly away from the end 19 of the sleeve 18.

As a result of temperature change alone, movement of the metering edge 27 of the element 20 would closely follow that of the inlet port 16. However, since the sleeve 18 and element 20 expand less than the corresponding length of the body 14 the transducer 24 moves leftward, as viewed in the drawing, relative to the adjacent end of the element 20. This relative movement causes the Ps signal to indicate a rightward movement of the element 20 and the actuator 21 moves the element 20 to increase the volume flow through the valve 10 by an amount which compensates for the reduction in mass flow caused by the temperature rise. The values to be selected to effect compensation so that mass flow remains constant for a given position of the control element 20 are therefore the distance between the transducer 24 and the end 19 of the sleeve 18, and the coefficients of linear expansion of the body 14 and of the sleeve 18 and element 20.

It will be apparent that the foregoing explanation of operation during a rise in temperature also applies, with movements in opposite directions, to a temperature reduction.

It will be apparent that the foregoing explanation of operation during a rise in temperature also applies, with movements in opposite directions, to a temperature reduction.

The inlet port 25 has an exponential profile. Such a profile is disclosed in U.S. Pat. No. 4,471,809 to Thomsen et al, and is further described in U.S. Pat. No. 4,513,782 to Contartese et al, both incorporated herein by reference. As is known in the art the flow area of a variable orifice, one of whose members has an exponential profile, varies exponentially with relative movement between the control member by unit distance from an initial position produces the same percentage change in metered flow for all initial positions. Unit distance of movement of the control member relative to the port thereby results in larger flow changes when the metered flow is initially high than when it is initially low. An exponential profile thus provides a rapid response at high flows and high metering accuracy at low flows.

I claim:

1. A temperature compensating fluid metering valve comprising a body having a bore, a ported sleeve within said bore, said sleeve being secured to said body at one end of said bore, a metering element axially slidable in said sleeve and co-operating with ports therein to vary the effective flow area of said valve, an actuator coacting with said element to position the latter relative to said sleeve and a device secured to the other end of said bore for generating a signal corresponding to a sensed axial position of said element, said actuator being responsive to a difference between desired and sensed axial positions of said element, the linear coefficient of expansion of said body being larger than that of said sleeve and said element such that a change in metering area of said valve in response to a change in temperature compensates for a change in specific gravity of the fluid resulting from said change in temperature.

2. A valve as claimed in claim 1 in which said actuator comprises a valve arrangement for applying metering pressures to opposite ends of said control element.

3. A valve as claimed in claim 1 in which the port with which said metering element co-operates has an exponential profile.

4. A valve claimed in claim 2 in which the port with which said metering element co-operates has an exponential profile.

* * * * *

UNITED STATES PATENT AND TRADEMARK OFFICE
CERTIFICATE OF CORRECTION

PATENT NO. : 4,825,901
DATED : May 2, 1989
INVENTOR(S) : Trevor S. Smith

It is certified that error appears in the above-identified patent and that said Letters Patent is hereby corrected as shown below:

Column 2, delete lines 34 through 37.

Column 2, line 45, after "member", insert -- and a port. In consequence movement of the control member --.

Claim 2, line 2, delete "metering" and insert --control--.

Claim 2, line 3, delete "control" and insert --metering--.

Signed and Sealed this

Ninth Day of January, 1990

*Attest:*

JEFFREY M. SAMUELS

*Attesting Officer*   *Acting Commissioner of Patents and Trademarks*